Aug. 6, 1929. B. L. HENRY 1,723,482
SEALING DEVICE FOR INFLATABLE BODIES
Filed April 11, 1928
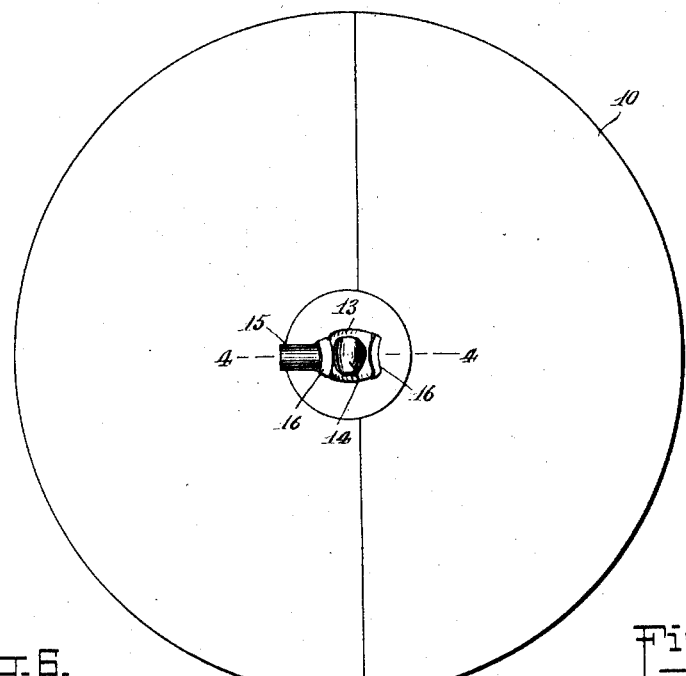
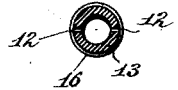
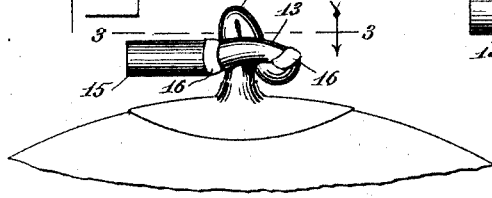
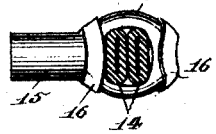
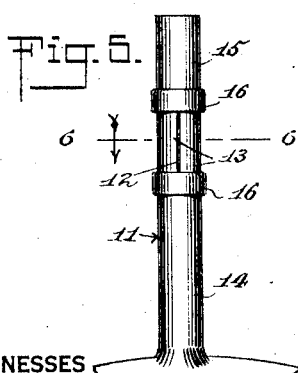
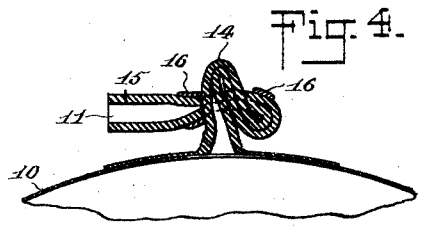
WITNESSES
INVENTOR
Beulah Louise Henry
BY
ATTORNEY Patented Aug. 6, 1929.

1,723,482

UNITED STATES PATENT OFFICE.

BEULAH LOUISE HENRY, OF NEW YORK, N. Y.

SEALING DEVICE FOR INFLATABLE BODIES.

Application filed April 11, 1928. Serial No. 269,162.

This invention relates to a device used for inflating and sealing inflatable bodies, such as the rubber bladders used in play balls of different kinds.

The principle object of the invention is the provision of a novel, simple, inexpensive and efficient means, in conjunction with an inflatable body, which enables the inflation of the body, and which serves to releasably seal the body, to prevent the escape of the inflation fluid from the body to maintain the body inflated, and which is readily releasable to allow the escape of the inflation fluid, for the purpose of deflating said body.

Another object of the invention is the provision of means of the indicated character, which obviates the use of separate and sundry means or fasteners, in conjunction with the usual rubber filling tube of inflatable bodies or bladders.

The nature of the invention and its distinguishing features and advantages will appear when the following specification is read in connection with the accompanying drawing, in which—

Figure 1 is a plan view of an inflatable body or bladder, and the sealing means connected therewith in a sealing condition.

Fig. 2 is a view of a portion of the inflatable body together with the sealing means in sealing condition, in side elevation.

Fig. 3 is an enlarged sectional view taken on the line 3—3 of Fig. 2.

Fig. 4 is an enlarged sectional view taken on the line 4—4 of Fig. 1.

Fig. 5 is a side elevation of the sealing means in normal condition.

Fig. 6 is a sectional view taken on the line 6—6 of Fig. 5.

In accordance with the present invention an inflatable body, such as a rubber bladder 10 used with play ball covers, is provided with a resilient, preferably rubber tube 11 attached or vulcanized to the bladder 10 at one end so as to communicate with the interior of the bladder. The said tube 11 will be of any preferred length in order to obtain the result looked for and which will appear. The said tube 11 has slits 12 extending lengthwise thereof, intermediate the ends. By slitting the tube 11, fastening means 13 of a resilient or elastic form is presented in the length of the tube. The said means 13 occurs in the tube at a point so as to present a comparatively long section 14, and a comparatively short end section 15. It will be apparent that in spite of the slits 12, the tube 11 will still serve for the purpose of inflating the bladder 10 by the use of a hollow stem which may be inserted in the tube 11 for the purpose of inflating the bladder. In fact the bladder 10 may be inflated without the use of such hollow stem by blowing air directly into the tube 11, since no appreciable amount of air will escape through the slits 12, especially when the tube is held at the slitted section thereof.

It will be apparent that the tube 11 may be folded upon itself because of its flexible and elastic nature. When it is desired to seal the bladder, after having been inflated, to prevent the escape of the inflation fluid or air, the section 14 of the tube is folded upon itself, whereupon the means 13 is brought into fastening or binding engagement with the folded section 14 to maintain the same in the folded condition as shown most clearly in Figs 2 and 4. This result is accomplished by reason of the fact that the folded section 14 may be projected through the slits 12, and due to the resiliency or elasticity of the tube, the sealing condition will be maintained until intentionally released. It will be apparent that the end section 15 serves for bringing the folded section 14 through the slits 12 and therefore constitutes a manipulating portion for bringing about the sealed condition and also for intentionally releasing the sealed condition to allow the escape of the inflation fluid or air.

In order to reinforce the tube 11 to prevent the same from bearing along the lines of the slits 12, there are provided bands 16 respectively at the opposite ends of the slits 12. The said band 16 may be cemented or vulcanized in place in surrounding relationship on the tube. The said bands 16 may be made of any suitable material, and are preferably made of rubber.

I claim:

1. The combination with an inflatable body, of a tube connected with said body for inflating said body, said tube adapted to be put into a folded condition, and slitted elastic means embodied by said tube with which the folded condition of the tube may be releasably maintained to prevent the deflation of the body after being inflated.

2. An inflatable body having an elastic tube communicating with the interior of the body for the purpose of inflating and deflating said body, said tube being slitted lengthwise intermediate its ends to present fastening means embodied by the tube, said tube being of a length to be folded upon itself, and said fastening means serving to maintain the folded condition of the tube to prevent escape of the inflation fluid from the body.

3. An inflatable bladder having an elastic tube communicating with the interior of the bladder, said tube having slits lengthwise intermediate its ends to present fastening means, and reinforcing elastic bands on the tube respectively at the ends of the slits, as and for the purpose specified.

4. The combination with an inflatable body, of a tube connected with said body for inflating and deflating the body, said tube having a foldable portion and a slitted portion and a manipulating end portion, said foldable portion when put in folded condition being receivable in the slits in said slitted portion, the slitted portion being elastic and adapted by contracting action to retain the foldable portion in folded condition, to prevent the escape of the inflation fluid from the body when the latter is inflated, said end portion being manipulatable to release the slitted portion from the foldable portion, to allow the escape of the inflation fluid from the body through the tube, for the purpose of deflating said body.

Signed at New York, in the county of New York and State of New York, this 10th day of April A. D. 1928.

BEULAH LOUISE HENRY.